United States Patent
Hsu

(10) Patent No.: US 10,611,106 B2
(45) Date of Patent: *Apr. 7, 2020

(54) METHODS AND SYSTEMS FOR MAKING AN OPTICAL FUNCTIONAL FILM

(71) Applicant: Roger Wen Yi Hsu, Rancho Cucamonga, CA (US)

(72) Inventor: Roger Wen Yi Hsu, Rancho Cucamonga, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/886,078

(22) Filed: Oct. 18, 2015

(65) Prior Publication Data

US 2017/0106609 A1    Apr. 20, 2017
US 2018/0354211 A9    Dec. 13, 2018

Related U.S. Application Data

(63) Continuation-in-part of application No. 14/806,579, filed on Jul. 22, 2015, now abandoned.

(60) Provisional application No. 62/116,545, filed on Feb. 15, 2015.

(51) Int. Cl.
| | |
|---|---|
| B29D 11/00 | (2006.01) |
| G02B 1/111 | (2015.01) |
| G02B 1/14 | (2015.01) |
| G02B 1/18 | (2015.01) |
| B29K 29/00 | (2006.01) |

(52) U.S. Cl.
CPC .. *B29D 11/00009* (2013.01); *B29D 11/00644* (2013.01); *B29D 11/00788* (2013.01); *G02B 1/111* (2013.01); *G02B 1/14* (2015.01); *G02B 1/18* (2015.01); *B29D 11/0073* (2013.01); *B29D 11/00653* (2013.01); *B29D 11/00865* (2013.01); *B29K 2029/04* (2013.01); *B29K 2995/002* (2013.01); *B29K 2995/007* (2013.01); *B29K 2995/0029* (2013.01); *B29K 2995/0034* (2013.01); *B29K 2995/0093* (2013.01)

(58) Field of Classification Search
CPC ........ B29D 11/00009; B29D 11/00644; B29D 11/00432; B29D 11/00923; B29D 11/00788; G02B 1/111; G02B 1/14; G02B 1/18; G02C 7/12; G02C 7/108
See application file for complete search history.

(56) References Cited

U.S. PATENT DOCUMENTS

| | | |
|---|---|---|
| 3,440,257 A | 4/1969 | Susi |
| 5,286,420 A | 2/1994 | Claussen |
| 5,326,507 A | 7/1994 | Starzewski |
| 5,423,100 A | 6/1995 | Misawa et al. |

(Continued)

FOREIGN PATENT DOCUMENTS

| | | |
|---|---|---|
| CN | 107636056 | 1/2018 |
| DE | 4406426 | 8/1995 |

*Primary Examiner* — Mathieu D Vargot
(74) *Attorney, Agent, or Firm* — Chris J. Zhen

(57) ABSTRACT

A method to make dyed functional film comprising the steps of providing a soluble polymer material; adding an appropriate solvent to the polymer material to make a soluble polymer solution; providing a soluble dye; adding an appropriate solvent to the dye to make a soluble dye solution; adding the dye solution to the polymer or PVA solution, and introducing the dyed polymer or PVA solution to a solution casting device; removing a thin dyed functional film from the casting device; and letting the dyed functional film dry and solidified.

16 Claims, 5 Drawing Sheets

(56) References Cited

U.S. PATENT DOCUMENTS

| | | |
|---|---|---|
| 5,686,639 A | 11/1997 | Cohen |
| 6,334,680 B1 | 1/2002 | Larson |
| 6,604,824 B2 | 8/2003 | Larson |
| 6,612,697 B1 | 9/2003 | Aurelius |
| 6,780,515 B2 | 4/2004 | Dobler |
| 6,794,431 B1 | 9/2004 | Rosania |
| 7,029,118 B2 | 4/2006 | Ishak |
| 7,354,150 B2 | 4/2008 | Sugimura |
| 7,520,608 B2 | 4/2009 | Ishak |
| 7,579,064 B2 | 8/2009 | Vonwiller |
| 7,630,128 B2 | 12/2009 | Krieg-Kowald |
| 7,703,916 B2 | 4/2010 | Sugimura |
| 7,771,782 B2 | 8/2010 | Baiocchi et al. |
| 8,298,671 B2 | 10/2012 | Qin et al. |
| 2002/0005509 A1* | 1/2002 | Teng ............... G02B 5/223 252/582 |
| 2004/0021941 A1 | 2/2004 | Iori |
| 2004/0156105 A1* | 8/2004 | Trapani ............ G02B 5/305 359/489.03 |
| 2005/0009964 A1 | 1/2005 | Sugimura |
| 2005/0058739 A1* | 3/2005 | Nakamura ........ B29C 41/28 425/224 |
| 2006/0196413 A1 | 9/2006 | Sugimura |
| 2007/0054216 A1* | 3/2007 | Habu ............... C09B 47/045 430/270.1 |
| 2007/0258038 A1 | 11/2007 | Kobayashi |
| 2007/0286998 A1* | 12/2007 | Hashimoto ........ B32B 23/00 428/220 |
| 2008/0144176 A1 | 6/2008 | Sugimura |
| 2009/0278268 A1 | 11/2009 | Hsu |
| 2010/0118263 A1 | 5/2010 | Tamura et al. |
| 2010/0249265 A1 | 9/2010 | Engardio |
| 2010/0271605 A1 | 10/2010 | Lipson |
| 2011/0135815 A1 | 6/2011 | Ganapthioppan |
| 2012/0016244 A1* | 1/2012 | Caffey ............. G02B 21/0012 600/473 |
| 2012/0018686 A1 | 1/2012 | Schlunt |
| 2013/0088772 A1* | 4/2013 | Hsu ................. G02C 7/10 359/352 |
| 2013/0107173 A1 | 5/2013 | Takeda |
| 2013/0209368 A1 | 8/2013 | Magdassi |
| 2014/0272355 A1 | 9/2014 | Sirois |
| 2016/0033684 A1 | 2/2016 | Kaneko et al. |
| 2016/0238859 A1* | 8/2016 | Hsu ................. G02C 7/108 |
| 2017/0022345 A1 | 1/2017 | Kitayama et al. |

* cited by examiner

METHODS AND SYSTEMS FOR MAKING AN OPTICAL FUNCTIONAL FILM

INCORPORATION BY REFERENCE

This continuation in part application claims the benefit of priority to the filing date of U.S. non provisional patent application Ser. No. 14/806,579 "Methods And Systems For Making An Optical Functional Film" which was filed on Jul. 22, 2015 which claims the benefit of priority under 35 U.S.C. 119(e) to the filing date of U.S. provisional patent application No. 62/116,545 "Solution Casting Method" which was filed on Feb. 15, 2015, and which are incorporated herein by reference in their entirety.

FIELD OF THE INVENTION

The present invention relates generally to an optical component, and more particularly it is directed to methods and system of making functional plastic film, functional Polymer film, or functional PVA film or functional PET film.

BACKGROUND OF THE INVENTION

It is well known that Ultraviolet (UV) light can cause serious flash burns to the cornea from high intensity light sources. Thus our eyes need protection from these harmful UV lights. The situations where our eyes definitely need protection from UV lights are welding, exposure to sunlight at elevation above 5000 ft (1524 m), or when the sun glares off snow or water, tanning, etc.

Not just UV light, infrared is also harmful. Wireless communication, appliances, computer, and lights all emit different levels of harmful radiation. In fact, there are also plenty of natural infrared, such as those from sunlight. Sunlight is composed of thermal-spectrum radiation that is slightly more than half infrared. At zenith, sunlight provides an irradiance of approximately 1 kilowatt per square meter at sea level, of which 527 watts is infrared radiation. Once the sunlight reaches the surface of Earth, almost all thermal radiation are of infrared.

The energy of sunlight on the ground can be categorized into approximately 3% Ultraviolet (UV) rays, 44% visible rays, and 53% Infrared (IR) rays. Therefore, when exposed to intense sunlight for a lengthy period of time without protection, human eyes may experience a burning or stinging sensation that is often accompanied by fatigue. Such discomfort can be especially noticeable for those wearing contact lenses, as the infrared can be absorbed by the contact lenses causing them to "warm up". Eye doctors always encourage a habit of putting on sunglasses when staying out in the sun for a period.

Traditionally, for protection lens to block harmful rays from a light source, the lenses must be coated with one or more layers of IR and/or visible dyes. Usually, soluble dyes and/or metallic oxide pigments are used for coating to absorb or reflect light of certain frequencies, eg., IR frequencies, UV frequencies, etc. Thus, coated lens would reduce or mitigate eye diseases such as cataract and glaucoma.

Because of the importance of sunglasses and protecting eyewear, there have been many coating techniques invented. IR or visible coating can be applied by dipping or spraying a solvent IR or visible dyes on another optical layer of a lens. However, because the majority of lenses are curved, the curvature of the lenses presents a significant obstacle in the application of the IR or visible coating, as the application of the coating may be uneven. As a consequence, the uneven application of the coating on a curved surface would reduce the effectiveness of the protection layers.

Using traditional methods like extrusion or injection, IR or visible dyes are added during the processes. Extrusion is a process used to create objects of a fixed cross-sectional profile. A material is pushed or pulled through a die of the desired cross-section. In a plastic extruding process, plastic is first melted into a viscous, semi-liquid state. After it softens, the plastic is pressed through a contoured opening. Using this technique, a curved lens may be created by pushing a softened optical film through a contoured opening.

Injection molding is a manufacturing process for producing parts by injecting material into a mold. Material for the part is fed into a heated barrel, mixed, and forced into a mold cavity, where it cools and hardens to the configuration of the cavity. For optical plastic films, whether it is an extrusion or injection method, heat is needed to soften the plastic films so they can be shaped curvaceously. Since dyes are sensitive to heat, some dye degradation occurs, and the effectiveness of eye protection reduces.

Another problem with these IR or visible coated lens is that they are easily scratched and are not resistant to chemicals or elements. Over time the protection layers lose their effectiveness and become harmful if not detected and replaced. To overcome this problem lens manufacturers have put another protection layer on top of the IR/visible layer either by spraying, dipping, or injection. However, as a consequence, additional layers make the lens thicker and to have a minimum thickness, which is a barrier for eyewear design and comfort.

Furthermore, traditional coating methods by injection or extrusion methods are aesthetically less appealing because infrared dye appears green in such a coating. In order to counteract or offset the undesirable green color, gray colors may be added to the PVA film. The addition of such gray colors, however, reduces the penetration of light, and therefore the visibility for the viewers, significantly. Finally, the addition of the gray colors to the PVA films on the lens results in higher costs for the lenses, and thus higher costs for the end products. Therefore, material and manufacturing processes for IR absorbing lenses that are inexpensive and quick are desirable.

Recently, to overcome the drawbacks of extrusion and injection methods, solution casting method has been invented and preferred. This manufacturing technology is unique in that the process does not require conventional extrusion or injection molding technologies, yet it readily incorporates components and features traditionally produced by these processes. This method utilizes a mandrel, or inner diameter mold, that is immersed in a tank of polymer solution or liquid plastic that has been specifically engineered for the process. Due to a combination of thermal and frictional properties, the polymer solution then forms a thin film around the mold. The mold is then extracted from the tank in a precisely controlled manner, followed by a curing or drying process.

Other casting devices being used in a solution casting method are a belt or drum machines. Typically, supporting belts are 1.0 to 2.0 m wide and 10 to 100 m long. Stainless steel belts are between 1.0 and 2.0 mm thick. Drums are typically 4 to 8 m in diameter and 1.20 to 1.50 m wide. The belt channel allows a stream of air to flow in machine direction or counter direction. The drum is tightly sealed to prevent vapor emissions and to direct the air stream against the direction of drum movement. One of the two pulleys or drums is connected to a drive that requires extremely accurate speed control to avoid even slight speed variations. One drum is connected to a servo system that adjusts belt tension in order to ensure constant flatness and "absence" of belt movements (vibrations) in the critical area just behind the caster, and to control the expansion and dilatation of the belt length caused by temperature changes. Belt machines have a guide system to avoid belt shifting during operation. The belt is guided by horizontal movements of the support drums. Many different support materials have been used for belts: Copper, silver-plated copper, chromium-plated steel, stainless steel, metal coated with polyvinylalcohol or gelatin, polyester film, PTFE film and other polymer films. At present the commonest support materials are stainless steel and chromium-plated surfaces. Important items for belt and drum machines are the material's heat conductivity, the technical processes used to create the required surface finish and the options for repairing small surface defects. This cast technique permits simple production of films with structured surfaces. The belt surface is clearly and accurately replicated on one surface of the film. The techniques used to adapt the surface of the drums or belts to highly glossy, structured or matt film finishes are proprietary methods.

Once the first layer of thin film is appropriately solidified, secondary features can be added to the product such as braided or coiled wire, laser-cut hypotubes or engineered metal reinforcements to prevent kinking, or imaging targets specific to the intended medical application. Multiple casting steps can then be repeated to encapsulate the reinforcements, build up wall thickness, add additional lumens and optimize column strength. The part is then removed from the mold after it is cured or solidified. This method works with liquid forms of solvent polymers without using excessive heat to cure the part. Since this method uses centrifugal force to shape the part, with the right liquidity ratio, a very thin layer of IR or visible dye solution can be added to an optical film without using excessive heat.

Another method to make the film is a static method such as cavity mold or plate casting or other similar method.

OBJECT OF THE INVENTION

Accordingly, it is the object of this invention to provide a method and system for manufacturing functional films.

It is also the object of the present invention to make optical films that have maximum optical purity and extremely low haze, using readily incorporated mixture components.

It is also the object of the present invention to make virtually isotropic functional films that have excellent flatness and dimensional stability.

It is also the object of the present invention to make functional films with absorbing dye soluble and offers more precision.

It is also the object of the present invention to make functional films without damaging or degrading heat-sensitive dyes.

It is also the object of the present invention to make dyed functional films without an additional liquid coated layer, thus no protection layer is exposed to scratches or chemicals or elements, or can add extra coating the IR protection layer.

It is also the object of the present invention to manufacture functional films that have less treatment, less layers, less defect, and less delamination, and save process time.

It is also the object of the present invention to manufacture functional films that are easily processed, have better quality and good function.

SUMMARY OF INVENTION

A method to make a dyed functional film comprising the steps of: providing a soluble polymer material, PVA powder, or PVA material; adding a solvent or water to the polymer material, PVA powder, or PVA material to make a soluble polymer or PVA solution; providing a soluble dye; adding a solvent to the IR and/or laser dye, photochromic, visible dye to make a soluble dye solution; adding the dye solution to the polymer or PVA solution; introducing the dyed polymer or PVA solution to a solution casting device; letting the solution casting device make a thin dyed functional film from the dyed polymer or PVA solution; removing the thin dyed functional film from the casting device; letting the film dry and solidified;

In one embodiment, the dyed functional film is dried in a temperature between 40-100° C. In another embodiment, the dyed functional film thickness is between 0.0025 mm-2.0 mm.

In one aspect of the invention, a method to manufacture a functional film is disclosed which comprises the steps of: providing a soluble polymer or a PVA material; adding a polymer solvent to the polymer or the PVA material to make a soluble polymer solution or a PVA solution; providing a soluble dye; adding a dye solvent to the soluble dye to make a soluble dye solution; adding the dye solution to the polymer solution or the PVA solution thereby making a dyed polymer solution or a dyed PVA solution; introducing the dyed polymer solution or the dyed PVA solution to a solution casting device; allowing the solution casting device to make a thin dyed optical film from the dyed polymer solution or the dyed PVA solution; removing the thin dyed optical film from the device; allowing the thin dyed optical film to dry and to solidify. In one embodiment, the dyed optical film is dried in a temperature between 40-100° C. In one embodiment, the dyed optical film thickness is between 0.0025 mm-2.0 mm. In one embodiment, the polymer is selected from a group consisting of TAC, Cellulose acetate, Cellulose propionate, Polyurethane, PVC, Silicon urethane copolymer, Acrylic, COP, Tetrafluoroethylene polymer, PC, PP, PE, Polyethersulfon, Polyetherimide, Polyvinylidene fluoride, etc., is added to an appropriate solvent, such as, triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride. In one embodiment,the polymer solvent is selected from a group consisting of triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, water. In one embodiment, the thin dyed optical film is capable to function as an eyewear lens, a vehicle window, a camera lens, a microscope lens, a building window, an electronic screen or a lamp cover protection. In one embodiment, the thin dyed optical film is laminated to a glass lens or a plastic lens. In one embodiment, a vacuum coating is applied to the thin dyed optical film. In one embodiment, an anti-Reflective coating is applied to the thin dyed optical film. In one embodiment, a hard coating is applied to the thin dyed optical film. In one embodiment, a water resistant coating is applied to the thin dyed optical film. In one embodiment, a scratch resistant coating is applied to the thin dyed optical film. In one embodiment, the thin dyed optical film is stretched to become a PVA polarized film. In one embodiment, the soluble dye is selected from a group consisting of an IR dye, a visible dye, a photochromic dye, or an absorbing dye. In one embodiment, the IR dye is selected from a group consisting of Tetrakis ammonium structure, Iminium phthalocyanines, naphthalocyanines, metal complexes, azo dyes, anthraquinones, quadratic acid derivatives, immonium dyes, perylenes Dianthrones Cyanines Heteroaromatics Metal Dithiolenes Oxadiazoles Phthalocyanines Spiropyra Tetraaryldiamines Triarylamines, Water soluble phthalocyanine and/or naphthalocyanine dye chromophores or similar dye.

In another aspect of the invention, a method to manufacture a functional film is disclosed which is comprising the steps of: providing a soluble polymer; adding a polymer solvent to the a soluble polymer to make a soluble polymer solution; providing a soluble dye; adding a portion of PVA material to the soluble polymer solution; adding a dye solvent to the soluble dye to make a soluble dye solution; adding the dye solution to the polymer solution thereby making a dyed polymer solution; introducing the dyed polymer solution to a solution casting device; allowing the solution casting device to make a thin dyed optical film from the dyed polymer solution; removing the thin dyed optical film from the device; allowing the thin dyed optical film to dry and to solidify.

In another aspect of the invention, an eyewear lens comprising a thin dyed optical film is disclosed wherein the thin dyed optical film is made with a portion of dyed polymer solution in a solution casting device wherein the dyed polymer solution is comprised of a portion of soluble dye solution and a portion of soluble polymer solution wherein the soluble dye solution is comprised of a portion of soluble dye and a portion of dye solvent and wherein the soluble polymer solution is comprised of a portion of polymer solvent and a portion of soluble polymer.

In another aspect of the invention, an eyewear lens comprising a thin dyed optical film wherein the thin dyed optical film is made with a portion of dyed PVA solution in a solution casting device wherein the dyed PVA solution is comprised of a portion of soluble dye solution and a portion of soluble PVA solution wherein the soluble dye solution is comprised of a portion of soluble dye and a portion of dye solvent and wherein the soluble PVA solution is comprised of a portion of polymer solvent and a portion of PVA material. In one embodiment, the soluble polymer is selected from a group consisting of TAC, Cellulose acetate, Cellulose propionate, Polyurethane, PVC, Silicon urethane copolymer, Acrylic, COP, Tetrafluoroethylene polymer, PC, PP, PE, Polyethersulfon, Polyetherimide, Polyvinylidene fluoride, etc., is added to an appropriate solvent, such as, triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride. In embodiment, the polymer solvent is selected from a group consisting of triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, water. In one embodiment, soluble dye is selected from a group consisting of an IR dye, a visible dye, a photochromic dye, or an absorbing dye. In one embodiment, the IR dye is selected from a group consisting of Tetrakis ammonium structure, Iminium phthalocyanines, naphthalocyanines, metal complexes, azo dyes, anthraquinones, quadratic acid derivatives, immonium dyes, perylenes Dianthrones Cyanines Heteroaromatics Metal Dithiolenes Oxadiazoles Phthalocyanines Spiropyra Tetraaryldiamines Triarylamines, Water soluble phthalocyanine and/or naphthalocyanine dye chromophores. In one embodiment, the polymer solvent is selected from a group consisting of triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, water. In one embodiment, soluble dye is selected from a group consisting of an IR dye, a visible dye, a photochromic dye, or an absorbing dye. In one embodiment, the IR dye is selected from a group consisting of Tetrakis ammonium structure, Iminium phthalocyanines, naphthalocyanines, metal complexes, azo dyes, anthraquinones, quadratic acid derivatives, immonium dyes, perylenes Dianthrones Cyanines Heteroaromatics Metal Dithiolenes Oxadiazoles Phthalocyanines Spiropyra Tetraaryldiamines Triarylamines, Water soluble phthalocyanine and/or naphthalocyanine dye chromophores.

In one aspect of the invention, a method to manufacture a functional film is disclosed comprising the steps of: providing a PVA material; adding a portion of water to said PVA material to make a PVA solution; providing a portion of water soluble near infrared dye; adding a portion of water or methanol to said water soluble near infrared dye to make a dye solution; adding said dye solution to said PVA solution thereby making a dyed PVA solution; introducing said dyed PVA solution to a solution casting device; allowing said solution casting device to make a thin dyed optical film from said dyed PVA solution; removing said thin dyed optical film from said device; allowing said thin dyed optical film to dry and to solidify. In one embodiment, the dyed optical film is dried in a temperature between 40-100° C. In one embodiment, the dyed optical film thickness is between 0.015 mm-3.0 mm. In one embodiment, the water soluble near infrared dye is selected from a group consisting of composition having a chemical formula of $C_{38} H_{46} Cl N_2 O_6 S_2 Na$; or $C_{43} H_{47} N_2 O_6 S_2 Na$; or $C_{44} H_{52} N_3 O_6 S_3 Na$; or $C_{38} H_{49} N_3 O_6 S_4 Cl$; $C_{46} H_{51} N_2 O_6 S_2 Cl$; $C_{52} H_{56} N_3 O_6 S_3 Na$. In one embodiment, the thin dyed optical film is capable to function as an eyewear lens, a vehicle window, a camera lens, a microscope lens, a building window, an electronic screen, a lamp cover protection, a phone screen, a TV screen, a computer screen or an appliance equipment. In one embodiment, the thin dyed optical film is laminated to a glass lens or a plastic lens. In one embodiment, a vacuum coating is applied to said thin dyed optical film. In one embodiment, an anti-Reflective coating is applied to said thin dyed optical film. In one embodiment, a hard coating is applied to said thin dyed optical film. In one embodiment, a water resistant coating is applied to said thin dyed optical film. In one embodiment, a scratch resistant coating is applied to said thin dyed optical film. In one embodiment, the thin dyed optical film is stretched to become a PVA polarized film. In another aspect of the invention, an eyewear lens comprising a thin dyed optical film is disclosed wherein said thin dyed optical film is made with a portion of dyed PVA solution in a solution casting device wherein said dyed PVA solution is comprised of a portion of dye solution and a portion of PVA solution wherein said dye solution is comprised of a portion of water soluble infrared dye and a portion of water and wherein said PVA solution is comprised of a portion of water and a portion of PVA material. In another embodiment, the water soluble near infrared dye is selected from a group consisting of composition having a chemical formula of $C_{38} H_{46} Cl N_{20}, S_2 Na$; or $C_{43} H_{47} N_2 O_6 S_2 Na$; or $C_{44} H_{52} N_3 O_6 S_3 Na$; or $C_{38} H_{49} N_3 O_6 S_4 Cl$; $C_{46} H_{51} N_2 O_6 S_2 Cl$; $C_{52} H_{56} N_3 O_6 S_3 Na$. A method to manufacture a functional film comprising the steps of: providing a PVA material; adding a portion of water to said PVA material to make a PVA solution; providing a portion of water soluble near infrared dye; adding a portion of water or methanol to said water soluble near infrared dye to make a dye solution; adding said dye solution to said PVA solution thereby making a dyed PVA solution; introducing said dyed PVA solution to a solution casting device; allowing said solution casting device to make a thin dyed optical film from said dyed PVA solution; removing said thin dyed optical film from said device; allowing said thin dyed optical film to dry and to solidify. In another embodiment, the dyed optical film is dried in a temperature between 40-100° C. In another embodiment, the dyed optical film thickness is between 0.015 mm-3.0 mm. In another embodiment, the portion of water soluble near infrared dye is selected from a group consisting of composition having a chemical formula of $C_{38} H_{46} Cl N_2 O_6 S_2 Na$; or $C_{43} H_{47} N_2 O_6 S_2 Na$; or $C_{44} H_{52} N_3 O_6 S_3 Na$; or $C_{38} H_{49} N_3 O_6 S_4 Cl$; $C_{46} H_{51} N_2 O_6 S_2 Cl$; $C_{52} H_{56} N_3 O_6 S_3 Na$.

In another embodiment, the thin dyed optical film is capable to function as an eyewear lens, a vehicle window, a camera lens, a microscope lens, a building window, an electronic screen, a lamp cover protection, a phone screen, a TV screen, a computer screen or an appliance equipment. In another embodiment, the thin dyed optical film is laminated to a glass lens or a plastic lens. In another embodiment, the vacuum coating is applied to said thin dyed optical film. In another embodiment, an anti-Reflective coating is applied to said thin dyed optical film. In another embodiment, a hard coating is applied to said thin dyed optical film. In another embodiment, a water resistant coating is applied to said thin dyed optical film. In another embodiment, a scratch resistant coating is applied to said thin dyed optical film. In another embodiment, the thin dyed optical film is stretched to become a PVA polarized film. In another aspect of the invention, an eyewear lens comprising a thin dyed optical film wherein said thin dyed optical film is made with a portion of dyed PVA solution in a solution casting device wherein said dyed PVA solution is comprised of a portion of dye solution and a portion of PVA solution wherein said dye solution is comprised of a portion of water soluble infrared dye and a portion of water and wherein said PVA solution is comprised of a portion of water and a portion of PVA material. In another embodiment, the water soluble near infrared dye is selected from a group consisting of composition having a chemical formula of $C_{38} H_{46} Cl N_{20}, S_2 Na$; or $C_{43} H_{47} N_2 O_8 S_2 Na$; or $C_{44} H_{52} N_3 O_8 S_3 Na$; or $C_{38} H_{49} N_3 O_6 S_4 Cl$; $C_{46} H_{51} N_2 O_8 S_2 Cl$; $C_{52} H_{56} N_3 O_6 S_3 Na$.

In another aspect of the invention, a method to manufacture a functional film is disclosed comprising the steps of: providing a soluble polymer; adding a polymer solvent to said polymer to make a soluble polymer solution, providing a soluble dye; adding a dye solvent to said soluble dye to make a soluble dye solution; adding said dye solution to said polymer solution thereby making a dyed polymer solution; introducing said dyed polymer solution a solution casting device; allowing said solution casting device to make a thin dyed optical film from said dyed polymer solution; removing said thin dyed optical film from said device; allowing said thin dyed optical film to dry and to solidify. In one embodiment, the dyed optical film is dried in a temperature between 40-150° C. In one embodiment, the dyed optical film thickness is between 0.015 mm-3.0 mm. In one embodiment, the polymer is selected from a group consisting of TAC, Cellulose acetate, Cellulose propionate, Polyurethane, PVC, Silicon urethane copolymer, Acrylic, COP, Tetrafluoroethylene polymer, PC, PP, PE, PET, Polyethersulfon, Polyetherimide, Polyvinylidene fluoride, Polyox (Ethylene Oxide), etc., is added to an appropriate solvent, such as, triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, Alcohol, phenol, o-chlorophenol, DMSO, trifluoroacetic acid (either pure or as mixtures with dichloromethane), 1,1,1,3,3,3-Hexafluoro-2-propanol, o-chlorophenol, o-cresol, tetrachloroethane/phenol, Dichloromethane (DCM) with a small amount of dioxane, nitrobenzene, etc. In one embodiment, the polymer solvent is selected from a group consisting of triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, Alcohol, phenol, o-chlorophenol, DMSO, trifluoroacetic acid (either pure or as mixtures with dichloromethane), 1,1,1,3,3,3-Hexafluoro-2-propanol, o-chlorophenol, o-cresol, tetrachloroethane/phenol, Dichloromethane (DCM) with a small amount of dioxane, nitrobenzene, etc. In one embodiment, the thin dyed optical film is laminated to a glass lens or sheet, or a plastic lens or sheet wherein said laminated lens forms at least one layer and is thereafter subject to a process of bending or a process of co-injection. In one embodiment, the soluble dye is selected from a group consisting of an IR dye, a visible dye, a photochromic dye, or an absorbing dye. In one embodiment, a vacuum coating is applied to said thin dyed optical film. In one embodiment, an anti-Reflective coating is applied to said thin dyed optical film. In one embodiment, a hard coating is applied to said thin dyed optical film. In one embodiment, a water resistant coating is applied to said thin dyed optical film. In one embodiment, a scratch resistant coating is applied to said thin dyed optical film. In one embodiment, the thin dyed optical film is capable to function as an eyewear lens, a vehicle window, a camera lens, a microscope lens, a building window, an electronic screen, a lamp cover protection, a phone screen, a TV screen, a computer screen or an appliance equipment.

BRIEF DESCRIPTION OF THE DRAWINGS

These and other features and advantages of the invention will not be described with reference to the drawings of certain preferred embodiments, which are intended to illustrate and not to limit the invention, and in which.

DETAILED DESCRIPTION OF THE INVENTION

Some embodiments are described in detail with reference to the related drawings. Additional embodiments, features, and/or advantages will become apparent from the ensuing description or may be learned by practicing the invention. The following description is not to be taken in a limiting sense, but is made merely for the purpose of describing the general principles of the invention. The steps described herein for performing methods form one embodiment of the invention, and, unless otherwise indicated, not all of the steps must necessarily be performed to practice the invention, nor must the steps necessarily be performed in the order listed. It should be noted that references to "an" or "one" or "some" embodiment(s) in this disclosure are not necessarily to the same embodiment, and such references mean at least one.

In accordance with the practice of the present invention, the methods and system of making a functional film disclosed herein provides many important advantages over those of prior arts. Specifically, the current invention yields a virtually isotropic, flat, and dimensionally stable functional film. Furthermore, the functional film achieves maximum optical purity and extremely low haze. The film is also dyed to a precise specification without affected by dye degradation problem. As a result, the present functional film has less treatment, less defect, less delamination, and less stress, and, thus, the optical lens requires fewer layers, and process time is shorter. Although yielding many advantages, the current method uses readily incorporated mixture components used in the traditional methods. The current invention does not increase material costs, and, in certain cases, it actually reduces material costs because it yields accurate optical properties/specification, and thinness functional films, which in turn reduce the number of layers in an optical lens.

Figure 1:
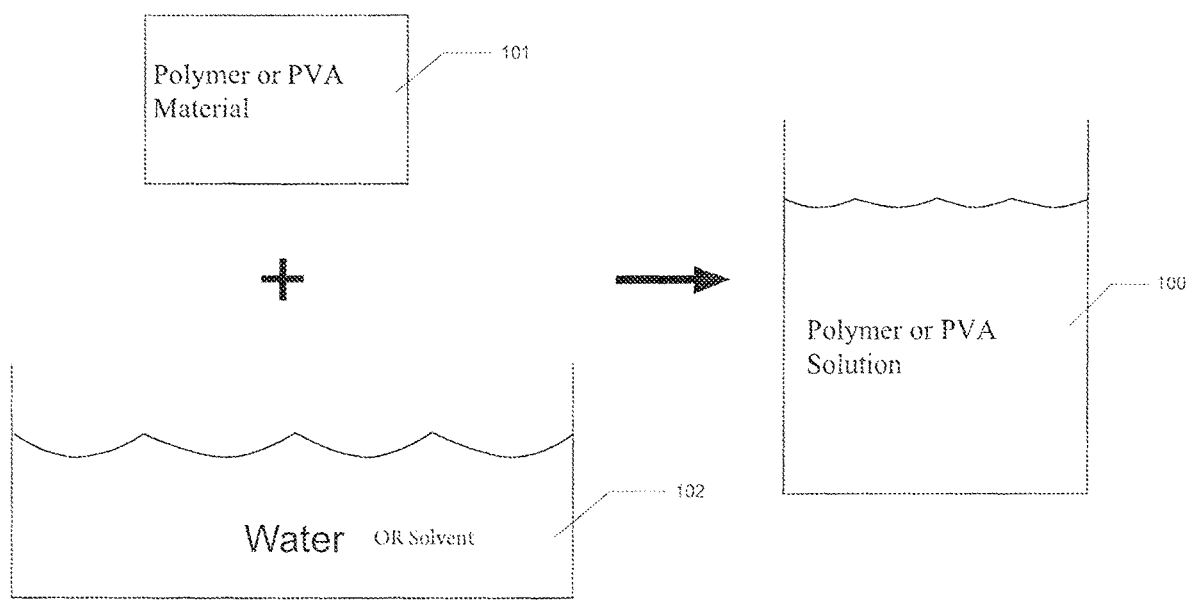
FIG. 1 is an illustrative view of the preparation of a polymer or PVA solution in a preferred solvent or water.

Referring to FIG. 1, a plastic polymer 101, such as TAC, Cellulose acetate, Cellulose propionate, Polyurethane, PVC, Silicon urethane copolymer, Acrylic, COP, Tetrafluoroethylene polymer, PC, PP, PE, Polyethersulfon, Polyetherimide, Polyvinylidene fluoride, etc., is added to an appropriate solvent 102, such as water, triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, Polyvinyl Alcohol, etc., to make the first solution 100, liquid A, a plastic polymer.

In another embodiment, a plastic polymer, such as TAC, Cellulose acetate, Cellulose propionate, Polyurethane, PVC, Silicon urethane copolymer, Acrylic, COP, Tetrafluoroethylene polymer, PC, PP, PE, PET, Polyethersulfon, Polyetherimide, Polyvinylidene fluoride is added is added to an appropriate solvent 102, such as , triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, Polyvinyl Alcohol, etc., to make the first solution 100, liquid A, a plastic polymer.

In another embodiment, a PVA material 101 is added to an appropriate solvent 102, such as water to form PVA solution.

Figure 2:
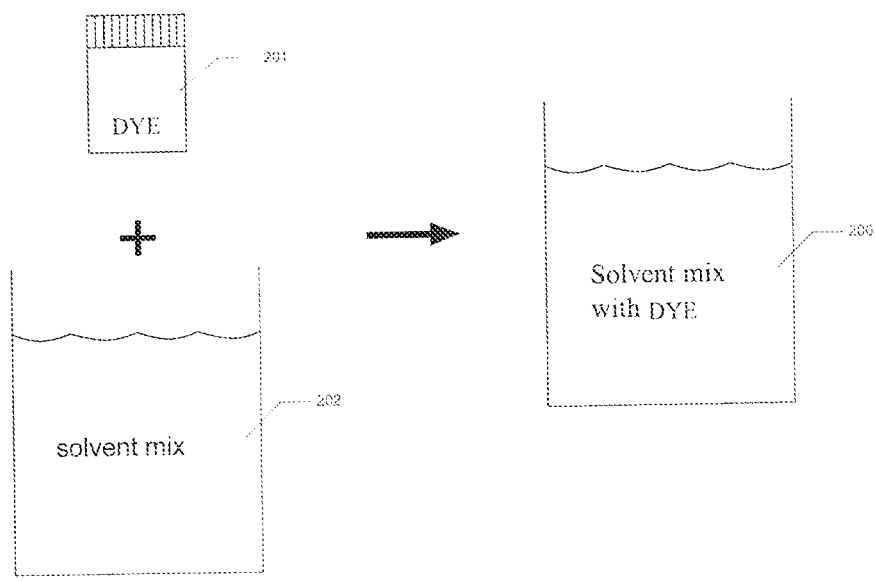
FIG. 2 is an illustrative view of the preparation of an IR dye and/or laser dye, photochromic, visible dye solution in a preferred solvent or water.

Referring to FIG. 2, a dye 201 such as IR and/or visible dye, photochromic dye, or any absorbing dyes, is added to an appropriate solvent 202 such as triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, water, etc., to make the second solution 200, liquid B, a dye solution.

In another embodiment, a water based dye 201 such as water soluble near infrared dye is added to an appropriate solvent 202 such as water or methanol to form a water soluble dye solution. In one embodiment, the water soluble near infrared dye is a composition having a chemical formula of $C_{38} H_{46} Cl N_2 O_6 S_2 Na$; or $C_{43} H_{47} N_2 O_6 S_2 Na$; or $C_{44} H_{52} N_3 O_6 S_3 Na$; or $C_{38} H_{49} N_3 O_6 S_4 Cl$; $C_{46} H_{51} N_2 O_6 S_2 Cl$; $C_{52} H_{56} N_3 O_6 S_3 Na$. In another embodiment, the water soluble near infrared dye is a near infrared fluorescent dye. In another embodiment, the water soluble near infrared dye is a Epolight™ 2735 water soluble dye.

Figure 3:
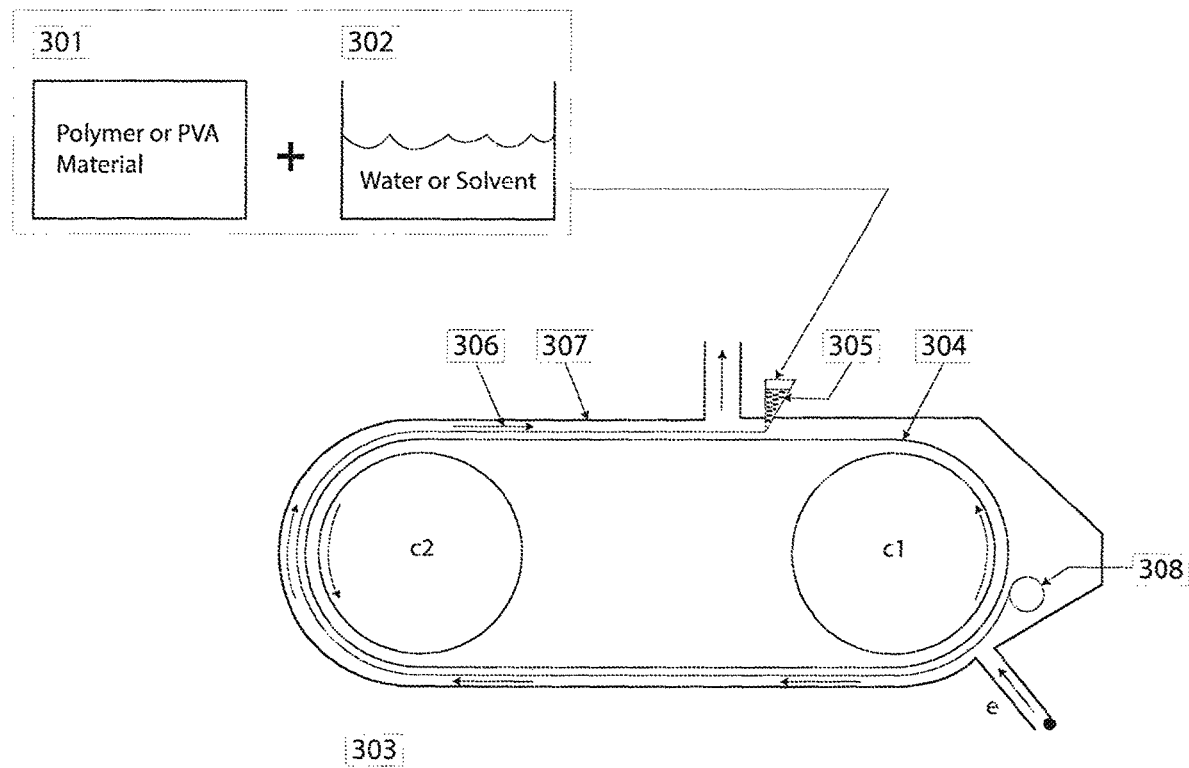
FIG. 3 is an illustrative view of a typical solution casting method and apparatus.

Referring to FIG. 3, the polymer casting method used in this invention is depicted. Polymer material, PVA powder, or PVA material 301 is mixed with a solvent 302. In one embodiment, low heat under 100° C. may be used to speed up the dissolving of the polymer in the solvent. However, in another embodiment, other polymer materials, such as TAC, may not need any heat to dissolve. The solution may be further processed to arrive at the required solution for making a functional film with certain optical properties. The final polymer or PVA solution is then introduced to the casting device 303 as depicted. In one embodiment, the final polymer or PVA solution is deposited onto a moving belt 304 through a caster or spreader 305. The polymer or PVA solution is dried and solidified by a stream of air 306 flowing in a belt channel 307 against the direction of the moving belt. It is appreciated that in other embodiments the stream of air 306 may flow in the direction of the moving belt. It is also appreciated that dry air, its direction, belt speed, space of the belt channel, etc. are calibrated such that the functional film achieve a desired thickness, dryness, and other qualities. Moreover, by the time the functional film reaches the film take-off 308 the input polymer or PVA solution must be solidified enough to be taken off the belt for further drying or processing.

Figure 4:
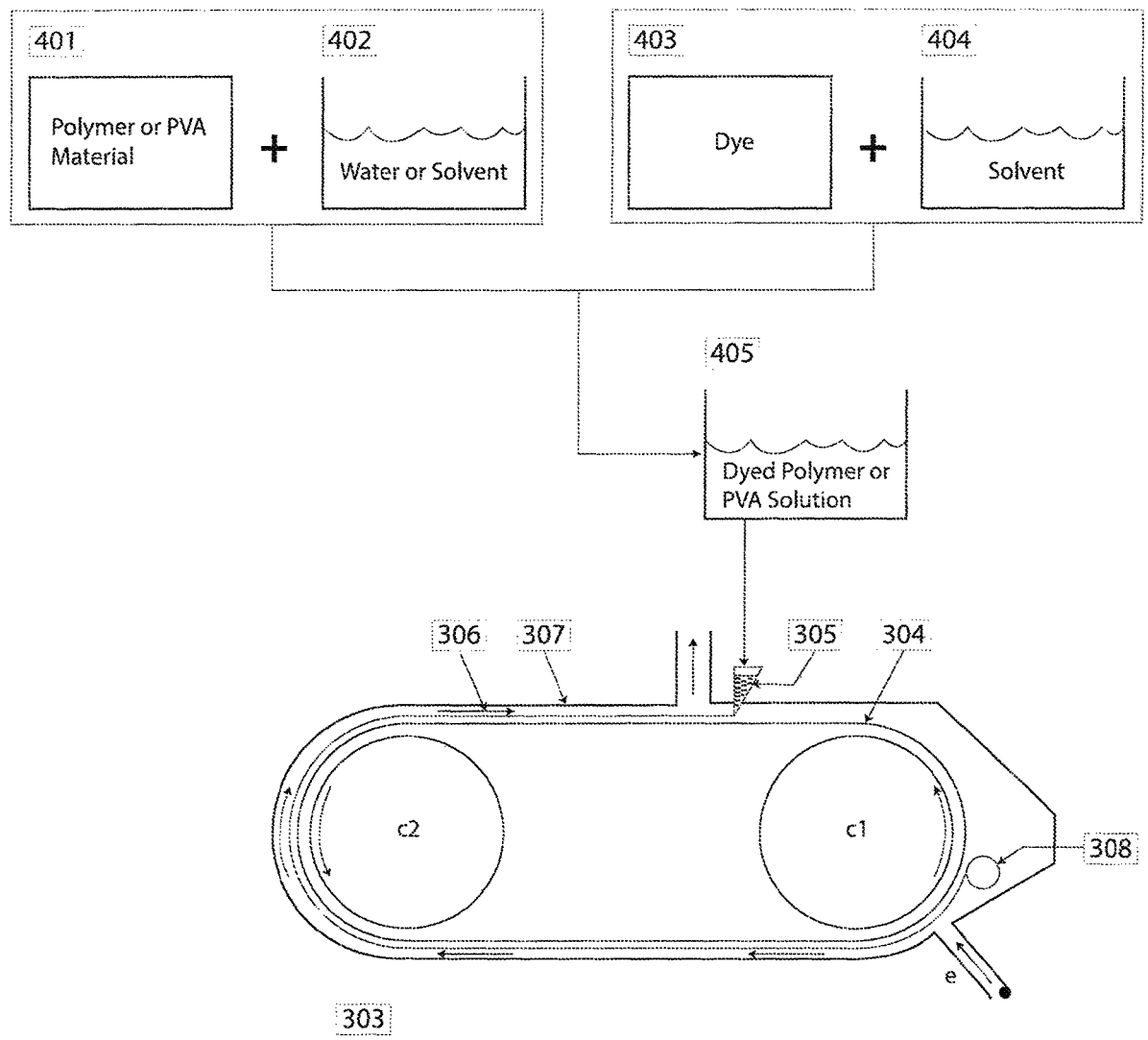
FIG. 4 is an illustrative view of the process of making a functional film using Solution Casting Method.

Referring to FIG. 4, the casting method as depicted in FIG. 3 is adapted for this invention. A liquid A, a polymer solution is made by adding a polymer material 401 to an appropriate solvent 402. Liquid B, a dye solution, is made adding a dye 403, which can be IR or visible dye, photochromic dye, or any absorbing dyes, to an appropriate solvent 404. In one embodiment, the Liquid B is comprised of between 0.05% to 5% of IR or visible dye, or photochromic dye or absorbing dye and the rest being in appropriate solvent. In one embodiment, the preferred embodiment is Liquid B comprising 3% of the dye. The resulting solutions are mixed together to make dyed polymer solution 405. In one embodiment, water soluble PVA (polyvinyl alcohol) with IR dye may also contain few percent of solvent soluble polymer, less than 10% of solvent soluble polymer, in the mix. In one embodiment, the Liquid A is comprised of approximately 9% to 25% of Polymer or PVA powder and 75% to 91% of appropriate solvent.

In another embodiment, the casting method as depicted in FIG. 3 is adapted for this invention. A PVA solution, is made by adding a PVA material 401 to an appropriate water or methanol 402. Liquid B, a water soluble dye solution, is made by adding a portion of water soluble near infrared dye 403, to an appropriate water or methanol 404. In one embodiment, the Liquid B is comprised of between 0.05% to 5% of water soluble near infrared dye and the rest being in appropriate water or methanol. In one embodiment, the preferred embodiment is Liquid B comprising 3% of the dye. The resulting solutions are mixed together to make dyed PVA solution 405.

Figure 5:
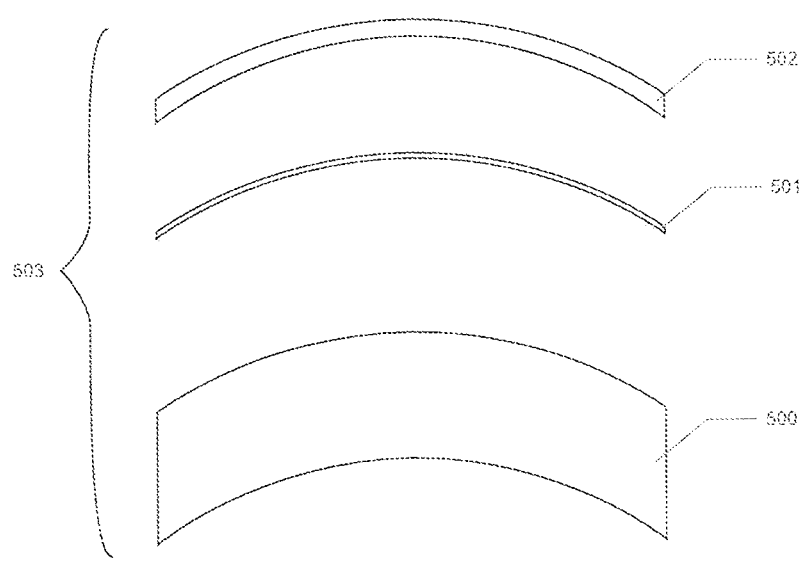
FIG. 5 is an illustrative view of laminating a new functional film as an optical component with other materials to make an eyewear optical lens, camera lens, microscope lens, car windows, building windows, electronic screen, lamp cover protection, etc.

The dyed PVA solution or dyed polymer solution 405 is next introduced into a solution casting device 406. This device would utilize a large belt 407 whose material and design are made appropriate for a desired functional film. In a preferred embodiment, the film is introduced to a dry environment where the temperature is between 40-150° C. The functional film is continuously taken off the moving belt for further drying, processing, rolled or sheeted. It is then used to produce an eyewear lens, camera lens, microscope lens, car windows, building windows, electronic screen, lamp cover protection, etc. In a preferred embodiment, the functional film thickness is between 0.015 mm-3.0 mm. Different films with different optical properties can be laminated together to obtain the desired eyewear lens, camera lens, microscope lens, car windows, building windows, electronic screen, lamp cover protection, etc. In one embodiment, referring to FIG. 5, a curved lens 503 is made wherein visible and/or IR dyed optical film 501, which is made using the present method as depicted in FIG. 3, is laminated on another clear film or glass 500, which has certain optical properties. Another scratch-resistant optical glass 502 is laminated on top of the dyed functional film 501 to protect the IR/visible layer from scratches, chemicals, and/or the elements.

In one embodiment, the process of making a functional film that can use multi-head flow machine to cast the materials, use different dyes, materials, or have different formats.

In another embodiment, while the functional film is made, it can be stretched to get orientation.

In another embodiment, the functional film has a physical characteristic of absorbing or reflecting 90% or more lights with wave lengths of 400-430 nm, and more than 37% lights with wave lengths of 760-2000 nm.

In one embodiment, after the functional film is made using the adapted solution casting method, the functional film is formed to the curvature of the final product, and may further be bound with an epoxy layer by injection molding.

In another embodiment, the functional film is further laminated to another PVA film as an additional layer. This process can be repeated for multiple layers of PVA films to achieve the intended product design. It is appreciated that different functional films can also be laminated together to achieve certain optical properties.

In one embodiment, Solution casting method using single layer of function film or extra laminate (one or more layers of function film), may also make desired shape or curve to put in mold for co-injection substrate (main support material).

In one embodiment, the functional film can be laminated on top or bottom of, or in between any types of glass, plastic and/or metal objects.

In one embodiment, the functional film can be formed into any geometry shapes, or casting molds to achieve an intended design.

In one embodiment, PVA water solution material is used as its own polarized and/or an additional polarized layer is laminated.

The invention claimed is:

1. A method of manufacturing an eyeglass lens using a functional film, the method comprising the steps of:
    a. providing a PVA material;
    b. adding a portion of water to said PVA material to make a PVA solution;
    c. providing a portion of water soluble near infrared dye;
    d. adding a portion of water or methanol to said water soluble near infrared dye to make a dye solution;
    e. adding said dye solution to said PVA solution thereby making a dyed PVA solution;
    f. applying said dyed PVA solution onto a running belt inside a channel;
    g. allowing said dyed PVA solution to solidify as a thin optical film on said running belt by supplying air flow inside the channel, and controlling thickness, dryness, and absorption rate of the thin optical film by adjusting a combination of 1) direction of the air flow, 2) belt speed, and 3) space of the belt channel;
    h. removing said thin optical film from the running belt; and
    i. laminating or casting the thin optical film to the eyeglass lens,
    wherein the PVA solution has a polymer concentration between 9% and 25%, inclusive; the dye solution having a dye concentration between 0.05% and 5%, inclusive; the eyeglass lens has an absorption rate in the ultraviolet and infrared frequency range, the absorption rate comprising 90% or more for lights with wavelengths of 400-430 nm, and more than 37% for lights with wavelengths of 760-2000 nm.

2. The method of claim 1, wherein said thin optical film has a thickness between 0.015 mm-3.0 mm.

3. A method of manufacturing an eyeglass lens using a functional film, the method comprising the steps of:
    a. providing a soluble polymer;
    b. adding a polymer solvent comprising dichloromethane to said polymer to make a soluble polymer solution;
    c. providing an IR oil-based soluble dye;
    d. adding a dye solvent to said IR oil-based soluble dye to make a soluble dye solution;

e. adding said dye solution to said polymer solution thereby making a dyed polymer solution;
f. applying said dyed polymer solution onto a running belt;
g. allowing said dyed polymer solution to solidify as a thin optical film on said running belt;
h. removing said thin optical film from the running belt; and
i. laminating or casting the thin optical film to the eyeglass lens,
wherein the soluble polymer solution has a polymer concentration between 9% and 25%, inclusive; the dye solution having a dye concentration between 0.05% and 5%, inclusive; the eyeglass lens has an absorption rate in the ultraviolet and infrared frequency range, the absorption rate comprising 90% or more for lights with wavelengths of 400-430 nm, and more than 37% for lights with wavelengths of 760-2000 nm.

4. The method of claim 3, wherein said IR oil based soluble dye is selected from the group consisting of: tetrakis ammonium structure, naphthalocyanines, metal complexes, azo dyes, anthraquinones, quadratic acid derivatives, immonium dyes, perylenes, dianthrones, cyanines, heteroaromatics, metal dithiolenes, oxadiazoles, phthalocyanines, spiropyra, tetraaryldiamines, and triarylamines.

5. The method of claim 3, wherein said soluble polymer is selected from the group consisting of TAC, cellulose acetate, cellulose propionate, polyurethane, PVC, silicon urethane copolymer, acrylic, COP, tetrafluoroethylene polymer, PC, PP, PE, PET, polyethersulfon, polyetherimide, polyvinylidene fluoride, and ethylene oxide.

6. The method of claim 1, wherein the infrared dye is selected from the group consisting of composition having a chemical formula of $C_{38}H_{46}ClN_2O_6S_2Na$, $C_{43}H_{47}N_2O_6S_2Na$, $C_{44}H_{52}N_3O_6S_3Na$, $C_{38}H_{49}N_3O_6S_4Cl$, $C_{46}H_{51}N_2O_6S_2Cl$, and $C_{52}H_{56}N_3O_6S_3Na$.

7. The method of claim 3, wherein the polymer solvent further comprises a solvent selected from the group consisting of: triphenyl phosphate, diphenyl phosphate, methanol, resorcinol, tetraphenyl diphosphate, acetone, butanol, butyl acetate, butanol, biphenyl diphenyl phosphate, trichloromethane, MEK, EAC, IPA, MIBK, BCS, MCS, EAC, BAC, cyclohexanone, tetrahydrofuran, ether, esters, polyimides, dimethylformamide, polyvinylalcohol, methyl cellulose, starch derivatives, gelatine, methyl-ethylketon, tetrahydrofuran, and methylene chloride.

8. The method of claim 3, wherein said thin optical film has a thickness between 0.015 mm-3.0 mm.

9. The method of claim 3, wherein said polymer solvent further comprises methanol.

10. The method of claim 3, wherein said polymer solvent further comprises alcohol.

11. A method of manufacturing an eyeglass lens using an optical functional film, the method comprising the steps of:
a. adding a polymer solvent comprising dichloromethane to a soluble polymer to make a soluble polymer solution;
b. adding a dye solvent to an oil-based soluble IR dye to make a soluble dye solution;
c. adding the dye solution to the polymer solution to make a dyed polymer solution;
d. applying the dyed polymer solution onto a flat surface;
e. allowing said dyed polymer solution to solidify as a thin optical film on the flat surface; and
f. laminating or casting the thin optical film to the eyeglass lens,
wherein the polymer solution has a polymer concentration between 9% and 25%, inclusive; the dye solution having a dye concentration between 0.05% and 5%, inclusive; the eyeglass lens has an absorption rate in the ultraviolet and infrared frequency range, the absorption rate comprising 90% or more for lights with wavelengths of 400-430 nm, and more than 37% for lights with wavelengths of 760-2000 nm.

12. The method of claim 11, wherein the polymer solvent further comprises methanol.

13. The method of claim 11, wherein the polymer solvent further comprises alcohol.

14. The method of claim 11, wherein the thin optical film has a thickness between 0.015 mm-3.0 mm.

15. The method of claim 11, wherein the soluble polymer is selected from the group consisting of TAC, cellulose acetate, cellulose propionate, polyurethane, PVC, silicon urethane copolymer, acrylic, COP, tetrafluoroethylene polymer, polycarbonate (PC), PP, PE, PET, polyethersulfon, polyetherimide, polyvinylidene fluoride, and ethylene oxide.

16. A method of manufacturing an eyeglass lens using a functional film, the method comprising the steps of:
a. providing a soluble polymer;
b. adding a polymer solvent comprising dichloromethane to said polymer to make a soluble polymer solution;
c. providing an IR oil based soluble dye;
d. adding a dye solvent to said IR oil based soluble dye to make a soluble dye solution;
e. adding said dye solution to said polymer solution thereby making a dyed polymer solution;
f. applying said dyed polymer solution onto a running belt;
g. allowing said dyed polymer solution to solidify as a thin optical film on said running belt;
h. removing said thin optical film from the running belt; and
i. laminating or casting the thin optical film to the eyeglass lens,
wherein the thin optical film has a thickness between 0.015 mm-3.0 mm; the eyeglass lens has an absorption rate in the ultraviolet and infrared frequency range, the absorption rate comprising more than 37% for lights with wavelengths of 760-2000 nm.

* * * * *